United States Patent
Liu et al.

(10) Patent No.: US 7,483,484 B2
(45) Date of Patent: Jan. 27, 2009

(54) APPARATUS AND METHOD FOR DETECTING OPAQUE LOGOS WITHIN DIGITAL VIDEO SIGNALS

(75) Inventors: Shan Liu, Irvine, CA (US); Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 876 days.

(21) Appl. No.: 10/682,316

(22) Filed: Oct. 9, 2003

(65) Prior Publication Data

US 2005/0078222 A1 Apr. 14, 2005

(51) Int. Cl.
*H04N 7/12* (2006.01)
(52) U.S. Cl. ............... 375/240.01; 375/240; 375/240.12
(58) Field of Classification Search ................. 375/240, 375/240.01, 240.12, 240.16; 348/699, 700, 348/589
See application file for complete search history.

(56) References Cited

U.S. PATENT DOCUMENTS

| | | | |
|---|---|---|---|
| 5,617,149 A * | 4/1997 | Lee et al. ............... 348/699 |
| 5,668,917 A | 9/1997 | Lewine | |
| 5,920,360 A | 7/1999 | Coleman, Jr. | |
| 6,100,941 A | 8/2000 | Dimitrova et al. | |
| 6,847,408 B1 * | 1/2005 | Webb ............ 348/607 |
| 2003/0076448 A1 * | 4/2003 | Pan et al. ............ 348/589 |

OTHER PUBLICATIONS

Zyga et al, *A Generalized Regression Neural Network for Logo Recoginition*, 4th International Conference on Knowledge-based Intelligent Engineering Systems & Allied Technologies, 2000, Birghton, UK, vol. 2, pp. 475-478.

Yan, et al., *Erasing Video Logos Based on Image Inpainting*, IEEE International Conference on Multimedia and Expo, 2002, Lausanne, Switzerland, vol. 2, 521-524.

* cited by examiner

*Primary Examiner*—Allen Wong
(74) *Attorney, Agent, or Firm*—Kenneth L. Sherman, Esq.; Michael Zarrabian, Esq.; Myers Dawes Andras & Sherman, LLP (57) ABSTRACT

A detection method and system that allows detecting an opaque logo after it has appeared in the digital video program for a short period of time, by deriving and analyzing the stochastic characteristics of the video signal along the temporal axis.

28 Claims, 8 Drawing Sheets

APPARATUS AND METHOD FOR DETECTING OPAQUE LOGOS WITHIN DIGITAL VIDEO SIGNALS

FIELD OF THE INVENTION

The present invention relates to the field of digital video display, and more particularly, to a method for tracking the display and disappearance of detected logos.

BACKGROUND OF THE INVENTION

Increasingly, television broadcast signals include logos that are displayed on television screens over the broadcast programs as station identification. If logos stay on the screen for considerably long periods of time without change in their intensities, colors, patterns and locations, they may be annoying, and can cause problems such as the well-known screen burn on High Definition TV (HDTV) sets. In general, logos are classified into three types: opaque logos, transparent logos and animated logos. Because transparent and animated logos change their brightness and colors along with the background video content, or move around from time to time, they are unlikely to cause screen burn on HDTV sets. By contrast, opaque logos are more problematic, because they usually stay on the screen for considerably long period of time without changing their intensities and locations.

As such, techniques have been developed for detecting the logos within the broadcast video signals, and removing or processing the logos to avoid the above problems. U.S. Pat. No. 5,668,917 relies on the repetitive characteristic of opaque logos in detecting of logos and commercials. The similarity among successive frames is examined and then the matching segment is eliminated. However, as the transmission channels normally introduce some noise to the video signal, the similarity within the repeated logo region among sequential frames can be greatly reduced, specially when the noise reaches a relatively high level. In this case, the similarity check may not be good enough for logo detection.

In another related invention, U.S. Pat. No. 5,920,360, intensity change vectors for detecting fade transitions were defined. Though this method may have higher noise immunity by using a coarse level of spatial information, it does not utilize the temporal information carried in video sequences.

BRIEF SUMMARY OF THE INVENTION

The present invention addresses the above needs. In one embodiment, the present invention provides a detection method that allows detecting an opaque logo after it has appeared in the digital video program for a short period of time, by deriving and analyzing the stochastic characteristics of the video signal along the temporal axis. The first incoming video image frame is stored in a buffer. Thereafter, incoming frames are passed to a scene change detection module. To determine if there is a scene change in the incoming (current) frame relative to a previous (reference) frame, the difference between the incoming frame and the previous frame stored in the buffer is measured based on pixel intensities. If the difference is high (i.e., a scene change occurred), then the current frame is used for the next step analysis. Otherwise, the current frame is discarded and the next incoming frame is read in and examined by determining the difference between this incoming frame and the buffered reference frame.

As such, key (scene change) frames are used in the logo detection process. Once the key frames are determined, they are used for calculating the pixel-by-pixel stochastic characteristics in the temporal domain. After a logo detection time period, the calculated stochastic characteristics of all pixels in the image frame are compared with the given noise level. If the stochastic measurement of a pixel matches the noise level well, the pixel is determined as a logo pixel; otherwise, the pixel belongs to the background video content. The noise is generally introduced by the transmission channel and is always there. The noise level can be measured by its standard deviation, which is pre-detected. Once all pixels are examined and classified into logo or non-logo categories, a logo map is generated. However, there may be some unreliably detected logo/non-logo pixels, requiring application of a prost-processing scheme to refine the logo map such that it is more resistant to noise.

According to the present invention, temporal stochastic characteristics are used to determine if a pixel belongs to the logo or background video content. The standard deviation of the noise is utilized to help logo/non-logo decision when the digital video signal is noisy. A post-processing scheme is applied to refine the logo map, such that the final logo map is more resistant to noise and is smoother. Therefore, a detection method according to the present invention is very reliable, which can detect logos in very noisy videos.

Other objects, features and advantages of the present invention will be apparent from the following specification taken in conjunction with the following drawings.

DETAILED DESCRIPTION OF THE INVENTION

A detection method according to an embodiment of the present invention allows detecting an opaque logo after it has appeared in the digital video program for a short period of time (e.g., 3 minutes), by deriving and analyzing the stochastic characteristics of the video signal along the temporal axis. As noted, the first incoming video image frame is stored in a buffer. Thereafter, incoming frames are passed to a scene change detection module. To determine if there is a scene change in the incoming (current) frame relative to a previous (reference) frame, the difference between the incoming frame and the previous frame stored in the buffer is measured based on pixel intensities. If the difference is high (i.e., a scene change occurred), then the current frame is used for the next step analysis. Otherwise, the current frame is discarded and the next incoming frame is read in and examined by determining the difference between this incoming frame and the reference frame.

As such, key (scene change) frames are used in the logo detection process. Once the key frames are determined, they are used for calculating the pixel-by-pixel stochastic characteristics in the temporal domain. After a logo detection time period, the calculated stochastic characteristics of all pixels in the image frame are compared with the given noise level. If the stochastic measurement of a pixel matches the noise level well, the pixel is determined as a logo pixel; otherwise, the pixel belongs to the background video content. Note that the noise is generally introduced by the transmission channel and is always there. The noise level can be measured by its standard deviation, which is pre-detected. Once all pixels are examined and classified into logo or non-logo categories, a logo map is generated. However, there may be some unreliably detected logo/non-logo pixels, requiring application of a prost-processing scheme to refine the logo map such that it is more resistant to noise.

According to the present invention, temporal stochastic characteristics are used to determine if a pixel belongs to the logo or background video content. The mean and standard deviation of the noise are utilized to help logo/non-logo decision when the digital video signal is noisy. A post-processing scheme is applied to refine the logo map, such that the final logo map is more resistant to noise and is smoother. Therefore, a detection method according to the present invention is very reliable, which can detect logos in very noisy videos. Preferred embodiments of the present invention are described below in more detail with reference of accompanying drawings.

Figure 1:
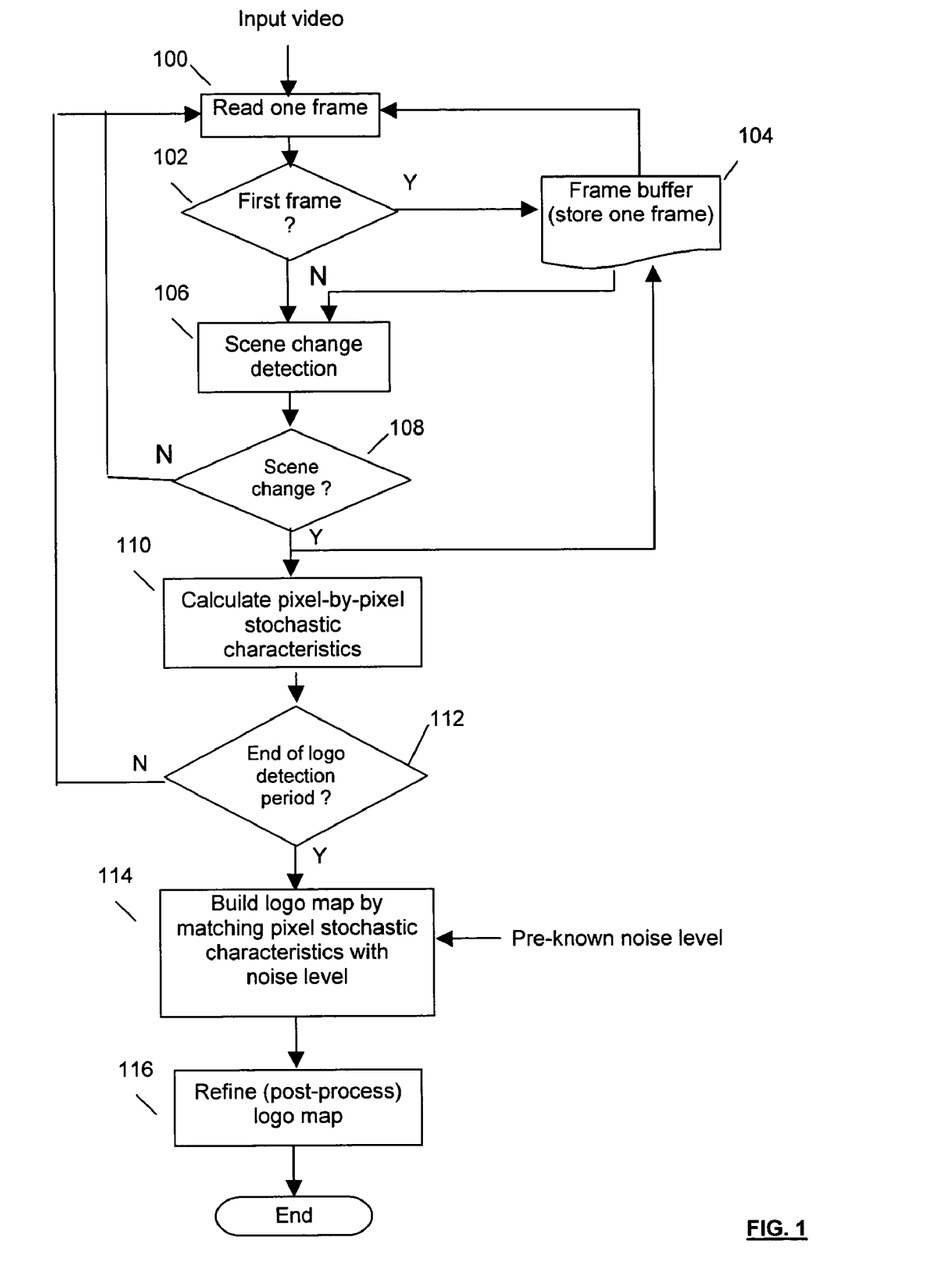
FIG. 1 illustrates the steps of an embodiment of a method according to the present invention for detecting a logo from noisy digital video signals represented by video frames of pixels.

FIG. 1 illustrates the steps of an embodiment of a method according to the present invention for detecting a logo from noisy digital video signals represented by video frames of pixels. A video frame is read in from a video stream forming a video clip (step 100). If it is the first frame of the video clip (determined in step 102), the frame is stored in a frame buffer for later reference (step 104), and the next incoming frame is read in as the current frame. Otherwise, if the incoming frame is not the first frame, it is detected if there is a scene change in the current frame relative to a reference frame (e.g., stored in the buffer) (step 106). In one example, scene change detection involves comparing the current frame and the reference frame by checking the pixel-by-pixel difference therebetween. If a scene change is detected (step 108), then pixel-by-pixel stochastic characteristics are calculated utilizing the current frame and the reference frame, and the current frame is placed in the frame buffer as the reference frame, replacing the existing reference frame (step 110). Otherwise, if scene change is not detected (i.e., the current frame and the reference frame are very similar), the current frame is skipped and the process proceeds to step 100 wherein next incoming frame is read in as the current frame. After step 110, it is determined if a logo detection time period (or number of frames to check) has been met (step 112). If not, the process proceeds to step 100 to read in the next frame. During the logo detection time period, the pixel-by-pixel stochastic characteristics are calculated, accumulated along the temporal axis and updated.

Once all frames within the logo detection time slot are examined, the final pixel-by-pixel stochastic characteristics are obtained and compared with a given noise level, represented by a standard deviation (STD) (step 114). If the stochastic measurement of a pixel matches a given noise level (STD) well, the pixel is indicated as a logo pixel. Otherwise, it is classified as a non-logo (i.e., video content) pixel. In step 114, a logo map is generated based on the logo/non-logo decisions on all pixels in the frame. Then the logo map is refined by the post-processing scheme (step 116) which outputs the final logo map that is smoother and more resistant to unreliable detection due to noise. The following paragraph provide further details of the steps of the example process of FIG. 1.

Figure 2:
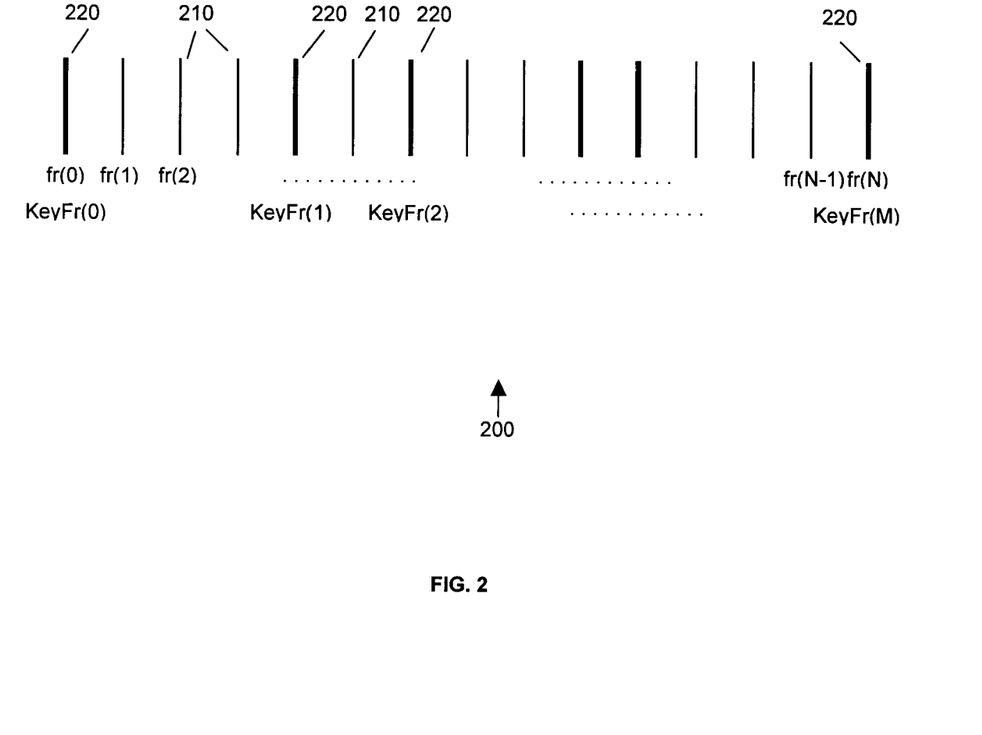
FIG. 2 illustrates an example of adaptively selected frames for logo detection based on scene change detection, in a vide clip comprising a set of frames.

FIG. 2 illustrates an example of adaptively selected frames for logo detection based on scene change detection, in a vide clip comprising a set of frames 200. FIG. 2 shows that instead of using all frames, only frames where scene change occurs are utilized for logo detection. For example, frames 210 fr(0), fr(1), . . . , fr(N) indicate the sequential frames in a video clip, wherein N is the total number of frames to be examined for the logo detection. The frames 220 KeyFr(0), KeyFr(1), . . . , KeyFr(M) are the key frames selected for logo detection where scene change occurs, wherein M is the number of key frames 220, such that M<=N. Using such a scene change detection process, computational complexity is significantly reduced. Further, by eliminating the similarities among successive frames, logo detection is more reliable.

Figure 3:
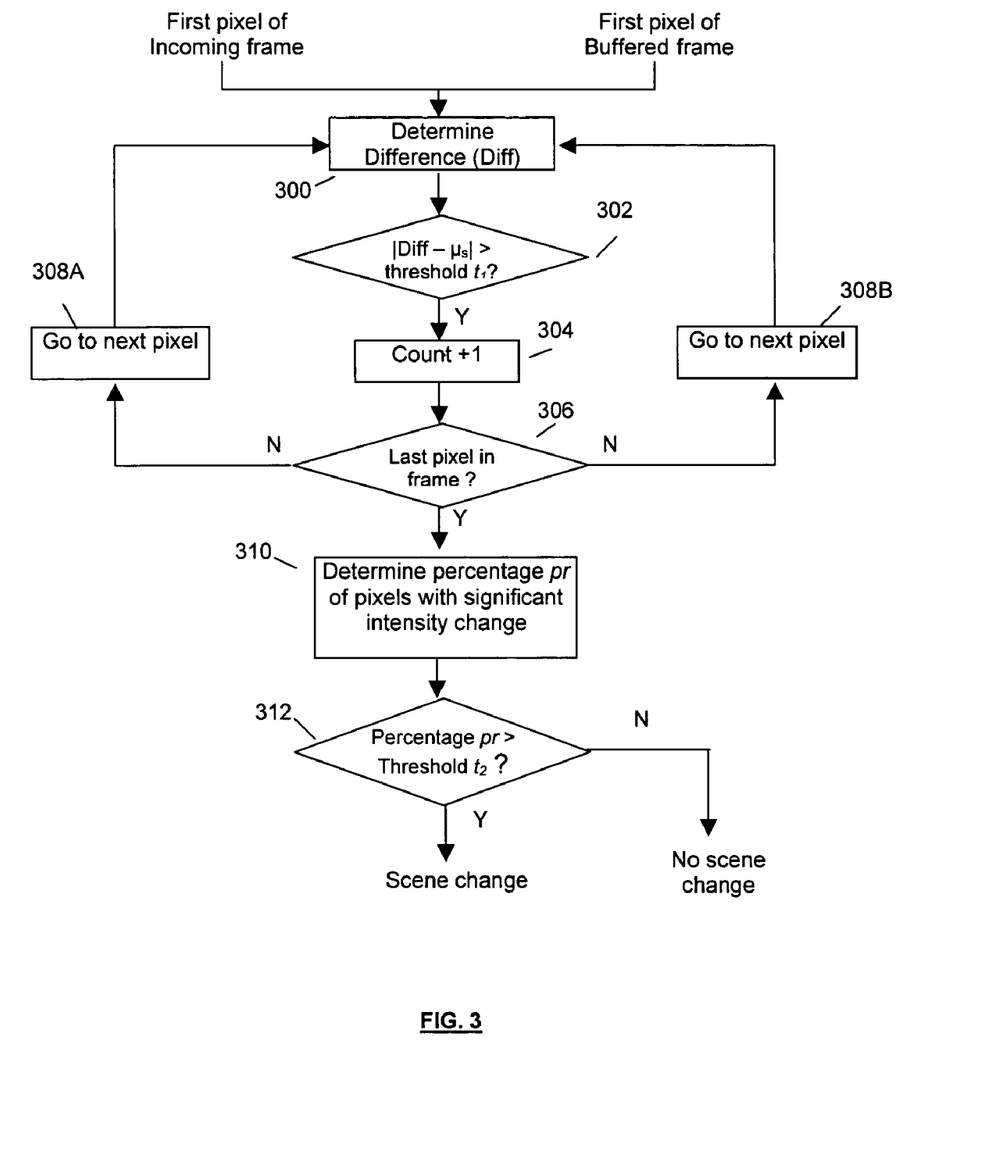
FIG. 3 shows a flow chart of the steps of an example scene change detection process according to the present invention.

FIG. 3 shows a flow chart of the steps of an example scene change detection process according to the present invention. Starting from the first pixel in the current frame, the pixel intensity difference (Diff) between the pixel in the current frame and a corresponding one in the reference frame is calculated (step 300). Then the noise mean ($\mu_s$) is subtracted from Diff and the absolute value of (Diff–$\mu_s$) is compared with a threshold $t_1$ (step 302). If it is greater, a count C (initially set to 0) is increased by one (step 304). The threshold, $t_1$, is a function of noise, such that: $t_1 = a \times n + b$, wherein n denotes the noise level, and a and b are function parameters. For example, a can be set to 2 and b can be set to 5, such that the threshold $t_1$ is proportional to the noise level n, while b provides the tolerance range of measurement and computational errors. If the video is ideally noise free, the pixel intensities within the logo area should be constant among all frames. However, in practice there is noise in the video frames. Thus, the threshold $t_1$ is selected such that the pixel intensity value changes within the logo area (which is caused by the noise) are statistically less than the threshold $t_1$. That is, the pixel intensity value changes in the logo area due to noise should not contribute to the scene change. Further, the parameters a and b can be adjusted, wherein the larger they are, the fewer scene changes are detected (i.e., scene change detection sensitivity decreases).

After step 304, it is determined if the current pixel is the last pixel in the current frame (step 306). If not, then the next pixel from the current and the reference frame are selected (steps 308A and 308B, respectively) and the process returns to step 300. Otherwise, a percentage pr of the number of pixels with significant change in intensity is calculated (step 310). As such, after the absolute differences (with noise mean subtracted) between all pixels in the current frame and the reference frame are examined, the percentage pr of the number of pixels with significant change in intensity is calculated as pr(%)=C/N, wherein C is the count and N is the total number of pixels in the current frame. The percentage pr is then compared to a threshold $t_2$ (step 312), wherein if pr is greater than the threshold $t_2$ a scene change is detected. Note that in contrast to the threshold $t_1$ whose unit is an integer of pixel intensity value, the threshold $t_2$ is compared against as a percentage.

From example observations, the number of logo pixels in a frame is mostly less than e.g. 20% of the total number of pixels in the frame. Because pixel intensity value changes in the logo area should not contribute to the scene change, in one example the threshold $t_2$ can be set to about 80% in the real-world applications. Further, the larger the threshold $t_2$, the fewer scene changes will be detected.

Figure 4:
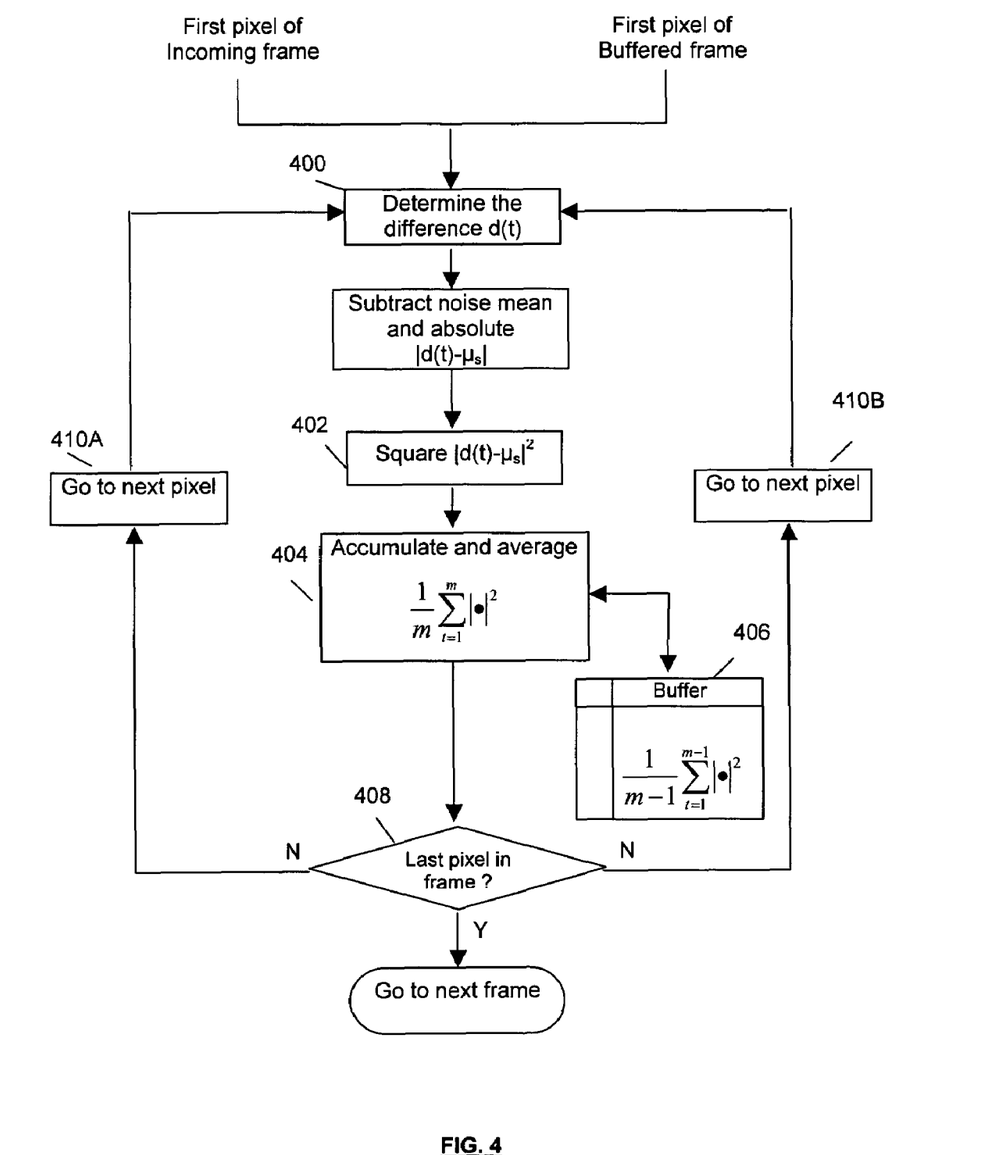
FIG. 4 shows a flow chart of the steps of an example process for calculating the stochastic characteristic of each pixel in the video frame in the temporal domain, according to the present invention.

FIG. 4 shows a flow chart of the steps of an example process for calculating the stochastic characteristic of each pixel in the video frame in the temporal domain, according to the present invention. Starting from the first in the current frame, the difference d(t) in pixel intensity between the pixel in the current frame and a corresponding one in the reference frame is calculated as $$d(t)=p(t)-p(t-\tau)$$

in step 400, wherein p(t) denotes the pixel intensity value in the current frame t, $p(t-\tau)$ denotes the corresponding pixel intensity value in the reference frame $t-\tau$. If the pixel with intensity p(t) is an opaque logo pixel, then d(t) equals the noise s(t). The standard deviation (STD) of noise $\sigma_s$ is expressed as:

$$\sigma_s = \sqrt{\frac{\sum_{t=0}^{M} |s(t) - \mu_s|^2}{M}}, \text{ when } M \to \infty.$$

As such the noise mean $\mu_s$ is subtracted from d(t) (step 401) and the absolute value of $|d(t)-\mu_s|$ is squared (step 402), accumulated and averages in step 404 as a stochastic measure $$\sigma_d = \sqrt{\frac{\sum_{t=0}^{M} |d(t) - \mu_s|^2}{M}},$$

wherein M is the total number of key (scene change) frames. This is measured for every pixel in the current video frame, and then compared with the noise STD for logo vs. non-logo classification.

Similar to $\sigma_s$, $\sigma_d$ is the STD of pixel intensity difference in temporal domain, assuming the mean of the pixel intensity difference equals $\mu_s$. Based on the expression of $\sigma_d$ above, $\sigma_d^2$ is the average of $|d(t)-\mu_s|^2$. To reduce hardware implementation costs, not all scene change frames and pixel intensity differences need be stored, until the end of the logo detection period. Instead, only one previous reference frame is stored in the frame buffer and thus the value $\sigma_d$ is updated in step 406 as each frame is processed (i.e., when t increases by one unit). The stochastic characteristic temporal value $\sigma_d^2$ at time m can be expressed as $$\sigma_d^2(m) = \frac{\sum_{t=1}^{m} |d(t) - \mu_s|^2}{m},$$

where m=[1,M]. Then the value $\sigma_d$ at time m+1 (i.e., $\sigma_d(m+1)$) can be conducted from $\sigma_d(m)$ as:

$$\sigma_d^2(m+1) = \frac{\sum_{t=1}^{m+1} |d(t) - \mu_s|^2}{m+1}$$

$$= \frac{\sum_{t=1}^{m} |d(t) - \mu_s|^2}{m+1} + \frac{|d(m+1) - \mu_s|^2}{m+1}$$

$$= \frac{\sigma_d^2(m) \times m}{m+1} + \frac{|d(m+1) - \mu_s|^2}{m+1}$$

$$= \sigma_d^2(m) \times \left(1 - \frac{1}{m+1}\right) + \frac{|d(m+1) - \mu_s|^2}{m+1}$$

$$= \sigma_d^2(m) + \frac{|d(m+1) - \mu_s|^2 - \sigma_d^2(m)}{m+1}.$$

Then in step 408, it is determined if the current pixel is the last pixel in the current frame. If not, then the next pixel from the current frame and the reference frame are selected (steps 410A and 410B, respectively) and the process returns to step 400 for said next pixels. Otherwise, the next (scene change) frame is processed according to the steps in FIG. 4.

Figure 5:
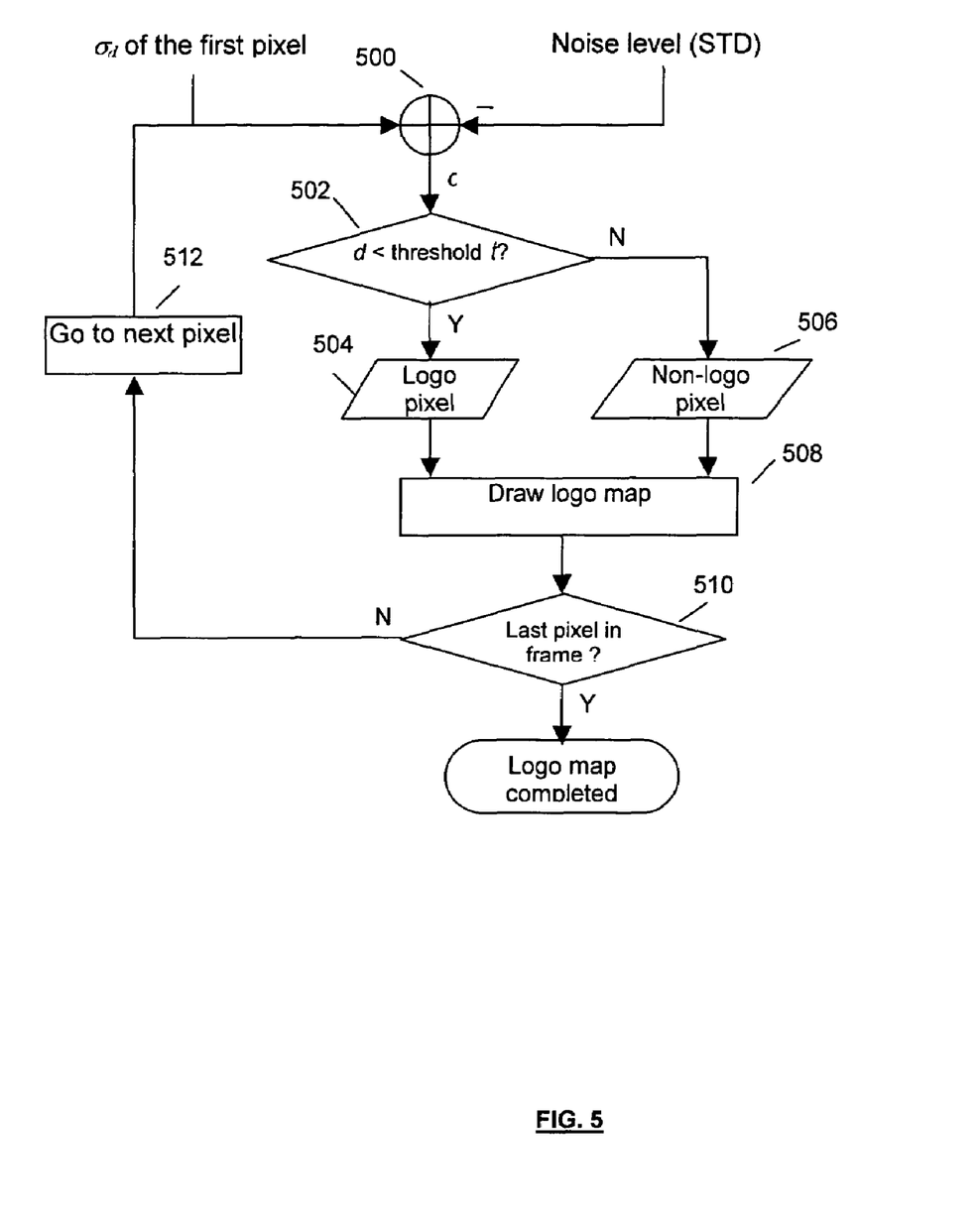
FIG. 5 illustrates a flow chart of the steps of an example process of decision making criteria on logo vs. non-logo pixel classification, according to the present invention.

FIG. 5 illustrates a flow chart of the steps of an example process of decision making criteria on logo vs. non-logo pixel classification, according to the present invention. Once the end of logo detection period is reached, the $\sigma_d$ of each pixel in the video frame (i.e. $\sigma_d(M)$) is obtained, and compared with the given noise level STD ($\sigma_s$) to obtain a difference d (step 500).

Figure 8:
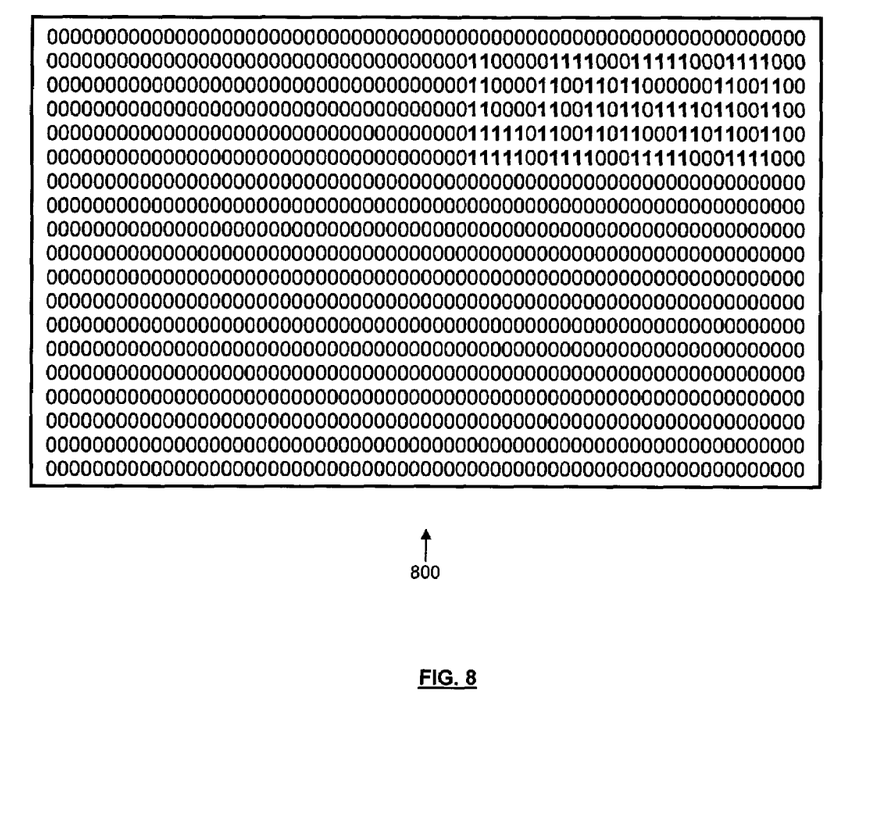
FIG. 8 illustrates an example of logo map.

If $d=|\sigma_d(i)-\sigma_s|<$threshold t (determined in step 502), then the $i^{th}$ pixel is classified as a logo pixel (step 504), otherwise, the $i^{th}$ pixel is classified as a non-logo pixel (506). Then, a logo map is generated (drawn) based on the logo vs. non-logo decisions on all pixels in the frame being processed (step 508). Then in step 510, it is determined if the current pixel is the last pixel in the current frame. If not, then the next pixel from the current frame is selected (step 512) and the process returns to step 500 for said next pixel. Otherwise, the logo map generation process for the current frame is complete (an example logo map is shown in FIG. 8, described further below).

Figure 6A:
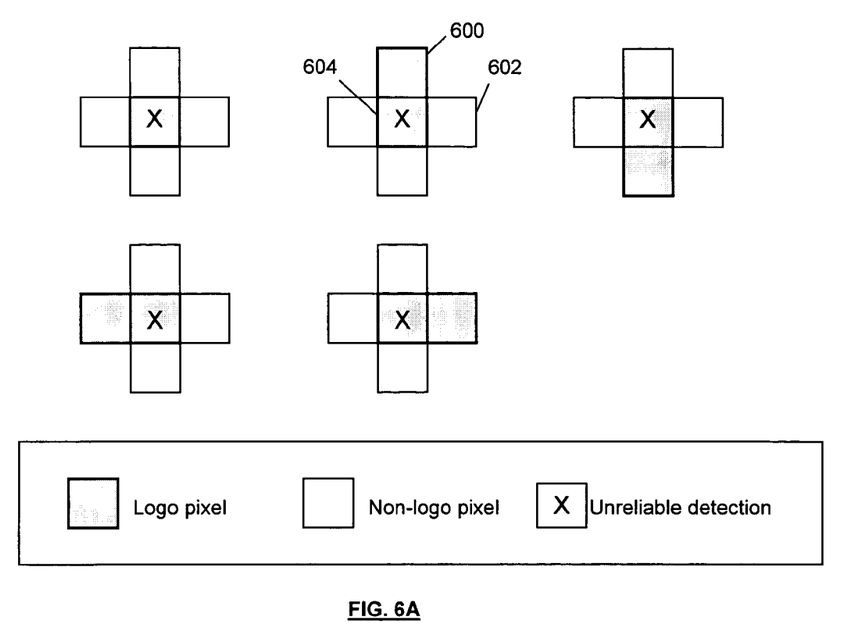
FIG. 6A illustrates an example logo refinement process for cases where a non-logo pixel is unreliably classified (detected) as a logo pixel.
Figure 6B:
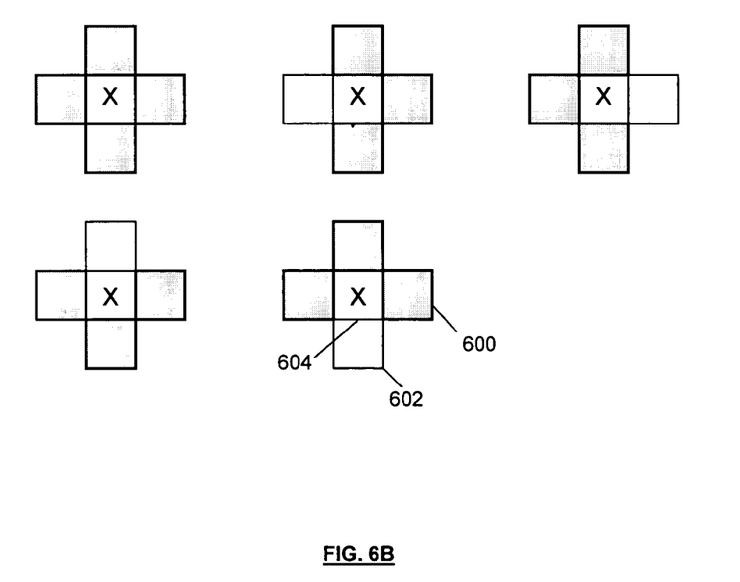
FIG. 6B illustrates an example logo refinement process for cases where a logo pixel is unreliably classified (detected) as a non-logo pixel.

FIG. 6A illustrates an example logo refinement process for cases where a non-logo pixel is unreliably classified (detected) as a logo pixel. In such cases, the pixel is reclassified as a non-logo pixel using a 4-connectivity check, according to the present invention. FIG. 6B illustrates an example logo refinement process for cases where a logo pixel is unreliably classified (detected) as a non-logo pixel. In such cases, the pixel is reclassified as a logo pixel using a 4-connectivity check, according to the present invention.

In FIGS. 6A and 6B, as shown in the legend of FIG. 6A, the shaded and bolded squares 600 denote properly/reliably classified logo pixels, and the normal un-shaded squares 602 denote non-logo pixels. The squares 604 with "X" symbols therein, are the unreliable classifications. After the logo map is obtained by the process of FIG. 4, the logo map is scanned once for refinement. Each pixel in the logo map is checked by examining its four-connectivity, i.e. four directly connected (top, bottom, left and right) neighboring pixels. If a pixel is classified as a logo pixel, while less than two of its neighboring pixels are classified as logo pixels, then the classification on this pixel is unreliable. FIG. 6A shows example cases that a non-logo pixel is unreliably classified as a logo pixel. FIG. 6B shows the cases where a logo pixel is unreliably classified as a non-logo pixel. If a pixel is classified as a non-logo pixel, while more than two of its neighboring pixels are classified as logo pixels, then classification of this pixel is unreliable. In either case in FIGS. 6A-6B, the unreliable logo/non-logo classifications are corrected by reclassification (e.g., flipping in the logo map).

The following provides a mathematical summary of the unreliable classifications. For each pixel in the logo map, let the logo pixel flag f be "1" and non-logo flag f be "0". Also, let (i, j) denote the column and row index of the pixel P in the logo map. Thus, f(i, j)=1, if the pixel P(i, j) is a logo pixel and f(i, j)=0, if P(i, j) is a non-logo pixel. Then, sum(i, j)=f(i−1, j)+f(i+1, j)+f(i, j−1)+f(i, j+1). If f(i, j)=1 and sum(i, j)<2, then the pixel has been mis-classified as a logo pixel, so set f(i, j)=0 to reclassify the pixel as a non-logo pixel. And, if f(i, j)=0 and sum(i, j)>2, then the pixel has been mis-classified as a non-logo pixel, so set f(i, j)=1 to reclassify the pixel as a logo pixel. In this example manner, the unreliably classified logo/non-logo pixels are reclassified, and thus the logo map is refined according to the present invention.

Figure 7:
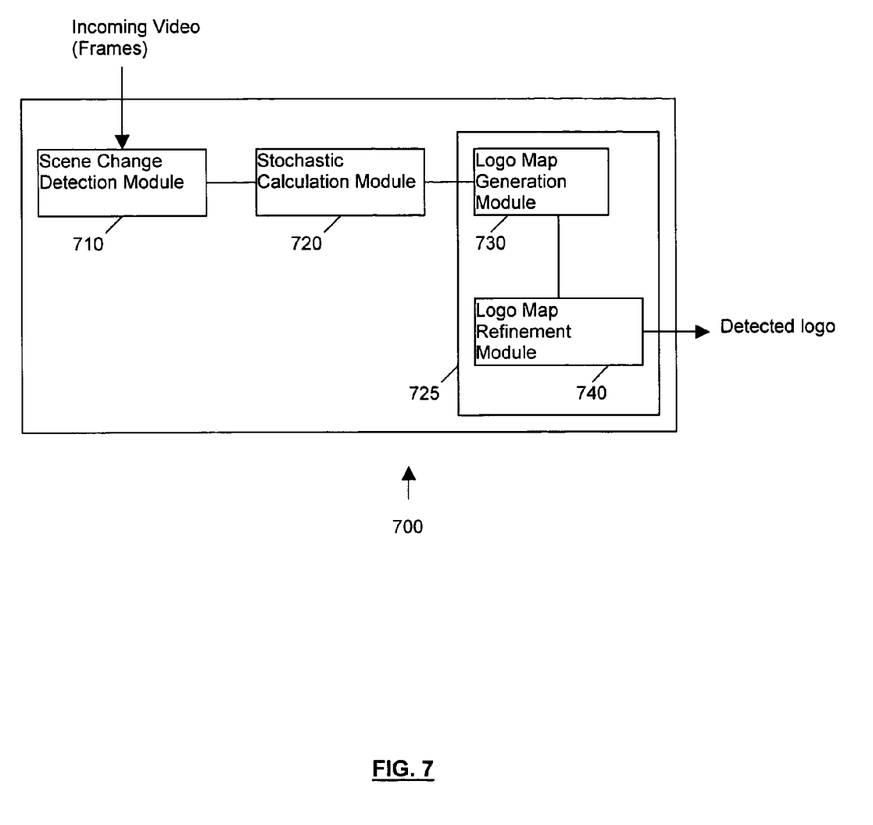
FIG. 7 illustrates a function block diagram of an embodiment of a logo detection system according to the present invention.

Referring to FIG. 7, in another aspect, such a logo detection method according to the present invention is implemented in an opaque logo detection system 700, comprising a scene change detection module 710, a stochastic calculation module 720 and an opaque logo detector 725 that includes a logo map generation module 730 and a logo map refinement module 740. The modules 710, 720, 725, 730 and 740 in the example architectural block diagram of system 700 implement the example steps described above (e.g., flowcharts in FIGS. 1, 3, 4, 5, 6A and 6B). Other implementations are possible.

As noted, FIG. 8 shows an example of the logo map 800. The logo map 800 can be viewed as a binary image of the same size as a video image frame. In this binary logo map image, each pixel has a binary value number (e.g., 0 or 1). Each binary number indicates whether the corresponding pixel belongs to a logo area (e.g., binary value number 1) or not (e.g., binary value number 0). In this example, the logo symbol spatially marked by the binary numbers is "LOGO".

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated. The aforementioned system 700 according to the present invention can be implemented in many ways, such as program instructions for execution by a processor, as logic circuits, as ASIC, as firmware, etc., as is known to those skilled in the art. Therefore, the present invention is not limited to the example embodiments described herein.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of detecting an opaque image comprising noise identification information in an area of each of a sequence of frames comprising pixels that represent digital video images, the method comprising the steps of:
   detecting a scene change between at least two of said frames, designated as a current frame and a reference frame;
   upon detecting the scene change, calculating a stochastic measure $\sigma_d$ of a plurality of pixels in the two frames based on a standard deviation of differences in pixel values in said two frames in a temporal domain; and
   detecting the opaque image in said area by comparing the stochastic measure $\sigma_d$ with a given noise level.

2. The method of claim 1, wherein the steps of detecting a scene change further include the steps of:
   generating a count C of a number of pixels in the current frame whose difference in intensity relative to corresponding pixels in the reference frame, after subtracting the given noise level, exceeds a threshold value.

3. The method of claim 1, wherein the steps of detecting an opaque image further include the steps of:
   classifying each pixel in said area of the current frame as an opaque image pixel if $\sigma_d$ for that pixel matches the given noise level, wherein the given noise level is represented by a standard deviation $\sigma_s$,
   wherein the opaque image comprises a logo.

4. The method of claim 3, further comprising the steps of:
   detecting and reclassifying any mis-classified pixels in a refinement process.

5. A method of detecting an opaque image in an area of each of a sequence of frames comprising pixels that represent digital video images, the method comprising the steps of:
   detecting a scene change between at least two of said frames, designated as a current frame and a reference frame;
   upon detecting a scene change, calculating a stochastic measure $\sigma_d$ of a plurality of pixels in the two frames based on a standard deviation of differences in pixel values in said two frames in a temporal domain; and
   detecting an opaque image in said area by comparing the stochastic measure $\sigma_d$ with a given noise level,
   wherein the steps of detecting a scene change further include the steps of:
   determining differences in pixel intensities between said two frames;
   subtracting the noise mean from said differences;
   comparing the absolute values of the differences with noise mean subtracted to a first threshold value to detect pixels with significant intensity changes; and
   comparing a percentage of a plurality of changed pixels in the current frame to a second threshold value to detect a scene change.

6. The method of claim 5, wherein the steps of determining differences in pixel intensities further include the steps of determining an absolute difference in pixel intensities between said two frames.

7. The method of claim 5, wherein the first threshold value, denoted as $t_1$, is a function of noise in the video images.

8. The method of claim 7, wherein the first threshold value $t_1$ is determined as $t_1 = a \times n + b$, wherein n denotes the noise level, and a and b are adjustable parameters, such that increasing -values of a and/or b results in a lower scene change detection sensitivity.

9. A method of detecting an opaque image in an area of each of a sequence of frames comprising pixels that represent digital video images, the method comprising the steps of:
   detecting a change between at least two of said frames, designated as a current frame and a reference frame;
   upon detecting a scene change, calculating a stochastic measure $\sigma_d$ of a plurality of pixels in the two frames based on a standard deviation of differences in pixel values in said two frames in a temporal domain; and
   detecting an opaque image in said area by comparing the stochastic measure $\sigma_d$ with a given noise level, wherein the steps of detecting a scene change further include the steps of, for each of a plurality of pixels in the current frame and each corresponding pixel in the reference frame:
determining a difference in pixel intensity between said two pixels;
subtracting a noise mean from said difference;
comparing a absolute value of the difference, from which the noise mean has been subtracted, to a first threshold value; and
incrementing a running count C if the difference exceeds the first threshold value.

10. A method of detecting an opaque image in an area of each of a sequence of frames comprising pixels that represent digital video images, the method comprising the steps of:
detecting a scene change between at least two of said frames, designated as a current frame and a reference frame;
upon detecting a scene change, calculating a stochastic measure $\sigma_d$ of a plurality of pixels in the two frames based on a standard deviation of differences in pixel values in said two frames in a temporal domain; and
detecting an opaque image in said area by comparing the stochastic measure $\sigma_d$ with a given noise level,
wherein the steps of detecting a scene change further include the steps of:
generating a count C of a number of pixels in the current frame whose difference in intensity relative to corresponding pixels in the reference frame, after subtracting the given noise level, exceeds a threshold value;
determining a value p as a function of a ratio of said count C and the total number N of pixels in each frame; and
comparing the value p to a second threshold value to detect the scene change.

11. A method of detecting an opaque image in an area of each of a sequence of frames comprising pixels that represent digital video images, the method comprising the steps of:
detecting a scene change between at least two of said frames, designated as a current frame and a reference frame;
upon detecting a scene change, calculating a stochastic measure $\sigma_d$ of a plurality of pixels in the two frames based on a standard deviation of differences in pixel values in said two frames in a temporal domain; and
detecting an opaque image in said area by comparing the stochastic measure $\sigma_d$ with a given noise level,
wherein the steps of calculating the stochastic measure $\sigma_d$ further include the steps of:
generating a squared difference obtained for each of a plurality of said pixels;
subtracting a noise mean from each squared difference;
generating a sum of absolute values of said squared difference with the noise mean subtracted; and
generating an average of the sums, and determining the stochastic measure $\sigma_d$ based on said average.

12. The method of claim 11, wherein the stochastic measure $\sigma_d$ is determined as:

$$\sigma_d = \sqrt{\frac{\sum_{i=1}^{M} |d(t) - \mu_s|^2}{M}},$$

wherein:
$d(t)=p(t)-p(t-\tau)$,
M is a number of frames involved in the scene change detection,
$p(t)$ denotes a pixel intensity value in one of said M frames, and
$p(t-\tau)$ denotes a corresponding pixel intensity value in another one of said M frames.

13. A method of detecting an opaque image in an area of each of a sequence of frames comprising pixels that represent digital video images, the method comprising the steps of:
detecting a scene change between at least two of said frames, designated as a current frame and a reference frame;
upon detecting a scene change, calculating a stochastic measure $\sigma_d$ of a plurality of pixels in the two frames based on a standard deviation of differences in pixel values in said
two frames in a temporal domain; and
detecting an opaque image in said area by comparing the stochastic measure $\sigma_d$ with a given noise level,
wherein the steps of detecting an opaque image further include the steps of:
classifying each pixel in said area of the current frame as an opaque image pixel if $\sigma_d$ for that pixel matches the given noise level, wherein the given noise level is represented by a standard deviation $\sigma_s$; and
classifying a pixel p(i) in the current frame as an opaque image pixel if $|\sigma_d(i)-\sigma_s|<t$, otherwise, classifying the pixel p(i) as a non-opaque image pixel,
wherein,
p(i) is the $i^{th}$ pixel in the current frame,
$\sigma_s$, is standard deviation of noise in the video images, and
t is a pre-defined threshold for tolerating measurement and computation errors.

14. A method of detecting an opaque image in an area of each of a sequence of frames comprising pixels that represent digital video images, the method comprising the steps of:
detecting a scene change between at least two of said frames, designated as a current frame and a reference frame;
upon detecting a scene change, calculating a stochastic measure $\sigma_d$ of a plurality of pixels in the two frames based on a standard deviation of differences in pixel values in said two frames in a temporal domain; and
detecting an opaque image in said area by comparing the stochastic measure $\sigma_d$ with a given noise level,
wherein the steps of detecting an opaque image further include the steps of:
classifying each pixel in said area of the current frame as an opaque image pixel if $\sigma_d$ for that pixel matches the given noise level, wherein the given noise level is represented by a standard deviation $\sigma_s$,
the method further comprising:
detecting and reclassifying any mis-classified pixels in a refinement process,
wherein the refinement process includes the steps of:
if a pixel is classified as a an opaque image pixel, while less than two of its neighboring pixels are classified as opaque image pixels, then reclassifying that pixel as a non-opaque image pixel; and
if a pixel is classified as a non-opaque image pixel, while more than two of its neighboring pixels are classified as opaque image pixels, then reclassifying that pixel as an opaque image pixel.

15. An opaque image detection system for detecting an opaque image comprising noise identification information in an area of each of a sequence of frames including pixels that represent digital video images, the system comprising:
- a scene change detector that detects scene change between at least two of said frames, designated as a current frame and a reference frame;
- a stochastic characteristic generator that upon detection of scene change by the scene change detector, calculates a stochastic measure $\sigma_d$ of said area based on a standard deviation of differences in pixel values in said two frames in the temporal domain; and
- an opaque image detector that detects an opaque image in said area by comparing the stochastic measure $\sigma_d$ with a given noise level represented by the standard deviation $\sigma_s$.

16. The system of claim 15, wherein the opaque image detector further classifies each pixel in said area of the current frame as an opaque image pixel if $\sigma_d$ for that pixel matches the given noise level, and wherein the opaque image comprises a logo.

17. An opaque image detection system for detecting an opaque image in an area of each of a sequence of frames including pixels that represent digital video images, the system comprising:
- a scene change detector that detects scene change between at least two of said frames, designated as a current frame and a reference frame;
- a stochastic characteristic generator that, upon detection of scene change by the scene change detector, calculates a stochastic measure $\sigma_d$ of said area based on a standard deviation of differences in pixel values in said two frames in the temporal domain; and
- an opaque image detector that detects an opaque image in said area by comparing the stochastic measure $\sigma_d$ with a given noise level represented by the standard deviation $\sigma$,
- wherein the scene change detector further determines differences in pixel intensities between said two frames, and compares the differences to a first threshold value to detect significantly changed pixels, and compares a percentage of significantly changed pixels within the current frame to a second threshold to detect a scene change.

18. The system of claim 17, wherein the scene change detector determines differences in pixel intensities by determining an absolute difference in pixel intensities between said two frames.

19. The system of claim 17, wherein the first threshold value, denoted as $t_1$ is a function of noise in the video images.

20. The system of claim 17, wherein the first treshold value $t_1$ is determined as $t_1 = a \times n + b$, wherein n denotes the noise level, and a and b are adjustable parameters, such that increasing values of a and/or b results in lower scene change detection sensitivity.

21. The system of claim 17, wherein the scene change detector further generates a count C of a number of pixels in the current frame whose differences in intensities relative to corresponding pixels in the reference frame, with noise mean subtracted, exceeds the first threshold value.

22. The system of claim 17, wherein the scene change detector is further configured such that, for each of a plurality of pixels in the current frame and each corresponding pixel in the reference frame, the scene change detector determines a difference in pixel intensity between said two pixels with noise mean subtracted, compares a difference to the first threshold value, and increments a running count C if the difference exceeds the first threshold value.

23. The system of claim 22, wherein the scene change detector further determines a value p as a function of a ratio of said count C and a total number N of pixels in each frame, and compares the value p to a second threshold value to detect scene change.

24. An opaque image detection system for detecting an opaque image in an area of each of a sequence of frames including pixels that represent digital video images, the system comprising:
- a scene change detector that detects scene change between at least two of said frames, designated as a current frame and a reference frame;
- a stochastic characteristic generator that, upon detection of scene change by the scene change detector, calculates a stochastic measure $\sigma_d$ of said area based on a standard deviation of differences in pixel values in said two frames in the temporal domain; and
- an opaque image detector that detects an opaque image in said area by comparing the stochastic measure $\sigma_d$ with a given noise level represented by the standard deviation $\sigma$,
- wherein the stochastic characteristic generator further calculates the stochastic measure $\sigma_d$ by generating a sum of squared differences, with noise mean subtracted, obtained for each of a plurality of said pixels, generating an average of the sum, and determining the stochastic measure $\sigma_d$ based on said average.

25. The system of claim 24, wherein the stochastic measure $\sigma_d$ is determined as:

$$\sigma_d = \sqrt{\frac{\sum_{i=1}^{M} |d(t) - \mu_s|^2}{M}},$$

wherein:
$d(t) = p(t) - p(t-\tau)$
M is a number of frames involved in the scene change detection,
$p(t)$ denotes a pixel intensity value in one of said M frames, and
$p(t-\tau)$ denotes a corresponding pixel intensity value in another one of said M frames.

26. An opaque image detection system for detecting an opaque image in an area of each of a sequence of frames including pixels that represent digital video images, the system comprising:
- a scene change detector that detects scene change between at least two of said frames, designated as a current frame and a reference frame;
- a stochastic characteristic generator that, upon detection of scene change by the scene change detector, calculates a stochastic measure $\sigma_d$ of said area based on a standard deviation of differences in pixel values in said two frames in the temporal domain; and
- an opaque image detector that detects an opaque image in said area by comparing the stochastic measure $\sigma_d$ with a given noise level represented by the standard deviation $\sigma$,
- wherein the opaque image detector further classifies each pixel in said area of the current frame as an opaque image pixel if $\sigma_d$ for that pixel matches the given noise level, and
- wherein the opaque image detector further classifies a pixel p(i) in the current frame as an opaque image pixel if $|\sigma_d(i) - \sigma_s| < t$, otherwise, the opaque image detector classifies the pixel p(i) as a non-opaque image pixel, wherein:

p(i) is the $i^{th}$ pixel in the current frame, and $\sigma_s$ is standard deviation of noise in the video images, and t is a pre-defined threshold for tolerating measurement and computation errors.

27. The system of claim 26, further comprising a refinement module that detects and reclassifies any mis-classified pixels in a refinement process.

28. The system of claim 27, wherein the refinement module is further configured such that if a pixel is classified as a an opaque image pixel while less than two of its neighboring pixels are classified as opaque image pixels, then the pixel is reclassified as a non-opaque image pixel, and if a pixel is classified as a non-opaque image pixel while more than two of its neighboring pixels are classified as opaque image pixels, then the pixel is reclassified as an opaque image pixel.

\* \* \* \* \*